United States Patent [19]
Greenfield et al.

[11] 4,199,790
[45] Apr. 22, 1980

[54] MATRIX WIPE GENERATOR FOR TELEVISION SIGNALS

[75] Inventors: Raymond L. Greenfield; John G. Lauderdale, both of Dollard des Ormeaux, Canada

[73] Assignee: Central Dynamics Ltd., Pointe Claire, Canada

[21] Appl. No.: 919,233

[22] Filed: Jun. 26, 1978

[51] Int. Cl.² ............................................. H04N 5/22
[52] U.S. Cl. .................................... 358/22; 358/182; 358/183
[58] Field of Search .......................... 358/183, 182, 22

[56] References Cited
U.S. PATENT DOCUMENTS

| | | | |
|---|---|---|---|
| 3,758,712 | 9/1973 | Hudson | 358/183 |
| 3,941,925 | 3/1976 | Busch | 358/183 |
| 4,028,727 | 6/1977 | Skryostrup | 358/182 |

Primary Examiner—David L. Stewart
Attorney, Agent, or Firm—Melvin Sher; Alan Swabey; Robert Mitchell

[57] ABSTRACT

The invention relates to a matrix wipe generator for television signals. With matrix switching, the television screen is divided into a plurality of blocks, and, if the screen originally contains the picture A, then picture B is switched into the blocks one at a time until all of the blocks, i.e., the whole screen, are filled with the picture B. The novel generator in accordance with the invention provides waveforms which give a Z-axis wipe effect, that is, the B picture appears to come into the screen from behind the A picture in each block.

10 Claims, 6 Drawing Figures

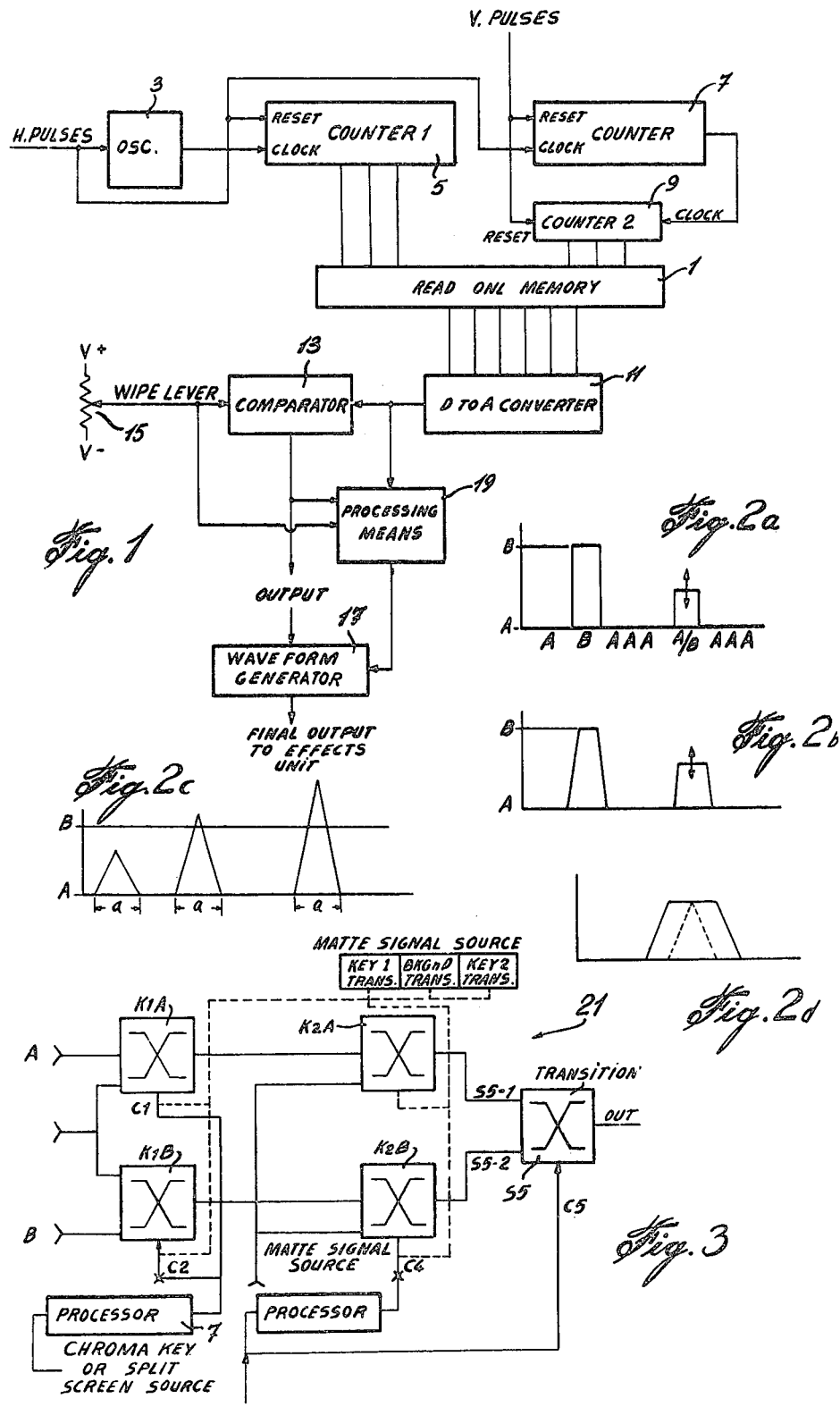

MATRIX WIPE GENERATOR FOR TELEVISION SIGNALS

BACKGROUND OF THE INVENTION

1. Field of the Invention

The invention relates to a novel matrix wipe generator for television signals. More specifically, the invention relates to such a wipe generator giving the effect of a Z-axis wipe.

2. Statement of the Prior Art

Switching between two video signals to produce a special effect, such as switching from picture A to picture B halfway across the width of a picture, is a well known technique. Such switching can be accomplished by fast or soft transistions as well known in the art. When such a transition is moved along the width of the picture, the effect is known as a wipe, and the transition takes place over the entire screen in either a vertical or horizontal direction.

Matrix switching of two pictures is also known in the art. With this technique, the screen is divided into a plurality of blocks, and, if the screen originally contains picture A, then picture B is switched into the blocks one at a time until all of the blocks, i.e., all of the screen, are filled with picture B. Such a transition may be referred to as a matrix wipe, and the generator for producing this effect may be referred to as a matrix wipe generator.

With the matrix wipe generators of the prior art, the transition in each block is fast, i.e., there is an abrupt switch in the block from the A picture to the B picture. The waveform which produces the fast transition comprises a horizontal level (the A signal) followed by a rise in the level, at 90° to the first level, and rising to a second level (the B level), and subsequently remaining horizontal at the second level.

The slow transition is initiated by a ramp signal proceeding from the first level to the second level. In the zone of the ramp, varying proportions of the A and B signal are added together, the net sum always being unity. Thus, the intensity of the A signal decreases as the intensity of the B signal increases. On the screen, the intensity of the A picture correspondingly decreases as the intensity of the B picture increases, until the B picture completely displaces the A picture.

Various switching and transition techniques are taught in, for example, U.S. Pat. Nos. 3,941,925—Busch et al—Mar. 2, 1976; 2,240,420—Schnitzer—Apr. 29, 1941; 2,784,246—Hurford—Mar. 5, 1957; and 2,193,869—Goldsmith—Mar. 19, 1940.

However, none of these patents, or any other teachings in the art known to applicant, teach a matrix wipe generator which gives the effect of a Z-axis wipe.

SUMMARY OF THE INVENTION

It is therefore an object of the invention to provide a novel matrix wipe generator.

It is a more specific object of the invention to provide such a matrix wipe generator which is adapted to give the effect of a Z-axis wipe.

In accordance with the invention, a matrix wipe generator for television signals comprises: storage means having a plurality of accessible storage locations, each location having a signal stored thereat; means for accessing said storage locations one at a time whereby to provide, at an output terminal of said storage means, the signal stored at the accessed location; comparator means having two input terminals and one output terminal; wipe lever means having a movable lever and an output terminal, and being adapted to provide, at the output terminal thereof, a signal which varies, from a lowest level to a highest level, depending on the position of said movable lever; the output terminal of said storage means being connected to one input terminal of said comparator means; the output terminal of said wipe lever means being connected to the other input terminal of said comparator means; waveform generator means having an input terminal and an output terminal; the output terminal of said comparator being connected to the input terminal of said waveform generator means; the levels of said signals in said memory locations varying non-sequentially relative to the sequence of said memory locations, the levels of said signals in said memory locations being between the highest and lowest levels of said signals of said wipe lever means; wherein, when a predetermined relationship exists as between the signal level at the one input terminal of said comparator and the signal level at the other input terminal of said comparator, said comparator will provide a signal to actuate said waveform generator means.

BRIEF DESCRIPTION OF THE DRAWINGS

The invention will be better understood by a review of the following description, together with the accompanying drawings, in which:

FIG. 1 is a block diagram of a matrix wipe generator in accordance with the invention;

FIGS. 2a to 2d show various waveforms produced by the waveform generator of FIG. 1; and FIG. 3 shows how the generator of FIG. 1 is connected to a mix effect switch arrangement.

DETAILED DESCRIPTION OF THE DRAWINGS

Referring to FIG. 1, 1 is a storage device having a plurality of accessible storage locations, for example, a ROM. Different signal levels are stored at the different locations for purposes to be described below.

The ROM is accessed by an arrangement consisting of oscillator 3, first counter 5, vertical pulse counter 7 and second counter 9. The counter 5 accesses one axis of the ROM address system while the counter 9 accesses the other axis.

To understand how the accessing arrangement works, let us consider the case where the picture is to be divided into 48 blocks consisting of 8 columns of blocks with six blocks in each column. The oscillator 3 is locked to a multiple of the line frequency, in this case, 8 times the line frequency, so that counter 5 will count up to 8 during the time interval of each horizontal line. The time interval between each count change will, of course, be equal, and each time the count is changed, a different address on one addressing axis of the ROM will be accessed by the counter 5. Counter 5 is reset to zero by each horizontal line pulse.

The line pulse also clocks counter 7, so that the count of this counter is changed at the line frequency. Further counter 7 is adjusted to provide an output only when the count reaches 1/6th the total lines in a field or a multiple thereof. Thus, if there were 48 lines in a field, counter 7 would provide an output only on the count of 8 or a multiple thereof. This output of counter 7 is fed to the clock terminal of counter 9, so that the count of 9 is changed 6 times in each field. Again, the time intervals between counts are equal, and a different address on the other addressing axis of the ROM is accessed every time the count is changed. Both counters 7 and 9 are reset by the vertical pulses. Thus, a total of 48 different addresses are accessed during each field. The time at and during which each address is accessed corresponds to the time of one of the 48 blocks into which the picture is divided, and the blocks are accessed in sequence as are the addresses in the ROM.

The output of the ROM is fed to a digital to analog converter 11 whose output is, in turn, fed to one input terminal of comparator 13. The other input terminal of 13 is fed from the output terminal of wipe lever means 15. The output of the wipe lever means is dependent on the position of the wipe lever as well known in the art.

In an alternative embodiment, the comparator is a digital comparator and the output of the ROM is fed directly to one input of the comparator. The output of the wipe lever means is fed to a high speed analog to digital convertor, and thence to the other terminal of the comparator.

The output of the comparator will provide a signal to activate waveform generator 17 only when there is a predetermined relationship between the inputs thereto. In one embodiment, the relationship exists when its ROM input is greater than its wipe lever input.

The locations of the ROM are filled with differing levels which vary in a predetermined arrangement which may conform to the sequence of the memory location or which may be non-sequential relative thereto. The wipe lever will initially be in a position to provide its highest output. As the lever is moved to its opposing position, its output will decrease, so that outputs from the ROM having lower and lower levels will be high enough to initiate the waveform generator.

In order to provide the effect of a Z-axis wipe, the waveform generator will produce waveforms of the type shown in FIGS. 2a, 2b and 2c. The waveform in FIG. 2a is a rectangular wave having an initial amplitude at the A level and rising to the B level. The effect which this waveform gives is that of the picture B coming into the tube from behind the picture A, and of the picture A gradually fading into the tube behind the picture B, i.e., a Z-axis wipe effect.

The waveform of FIG. 2b comprises the same rectangular wave with increasing amplitude, however, in this case, the rectangle is enclosed by, respectively, an increasing and decreasing (rising and falling) ramp. The increasing ramp is on the forward side of the rectangular wave, and the decreasing ramp on the aft side thereof. The ramps on either side will provide a colour border around the block to highlight the block and enhance the Z-axis wipe effect.

The waveform of FIG. 2c is a triangular wave increasing in amplitude. Initially, the wave is, effectively, a rising ramp adjacent to a falling ramp, so that there will be a small block of colour in the middle of the A picture. As the amplitude of the triangle increases, the top of the triangle will rise above the level B, so that what will appear on the screen will be a small portion of B picture surrounded by a narrow colour filled border. As the amplitude of the triangular wave increases, more of the block will be filled with the picture B as the picture B, along with its narrow colour filled border, increases in size. Finally, the block will consist of the picture B with the narrow colour border.

The effect on the screen of this wave form is that of picture B coming into the screen from behind picture A surrounded at all times by a narrow colour filled border, again, a Z-axis wipe effect.

FIG. 2d illustrates what happens when a second colour bordered block appears on the screen adjacent to a first colour bordered block already on the screen. In effect, the adjacent ramps "cancel" each other out so that the colour borders on the adjacent edges of the adjacent blocks disappear while the remaining colour borders are still on the screen. Thus, what appears on the screen is a block, twice the size of the regular block, filled with picture B, and surrounded at its outer edges with a colour border. As more blocks appear on the screen, more of the colour borders disappear, and when all blocks are on the screen, the colour border completely disappears.

Processing means 19 of FIG. 1 controls the rise in amplitude of the waveforms in FIGS. 2a to 2d.

FIG. 3 illustrates how the matrix generator controls the operation of a mix/effects switch arrangement. The arrangement is of the type taught in U.S. Pat. No. 4,028,727, Skrydstrup, June 7, 1977, at FIG. 2 thereof. As can be seen, the A signal is fed to one input of switch K1A and the B signal is fed to one input of switch K1B. The input common to both switches is left blank.

The output of 17 is fed to control terminals C4 (a matte signal source switch) and C5 (transition switch). K2B provides the colour input, and S5 switches the picture on the screen in the block from A to B.

In operation, a system consisting of the matrix generator and a mix/effects switching arrangement operates as follows.

Initially, the lever of the wipe lever means is set at the position wherein the output of the wipe lever means is at its highest level. The levels in the memory locations are all lower than this highest level.

When it is desired to effect a matrix wipe, the operator moves the lever to decrease the output of the wipe lever means. As the output of the wipe lever means decreases, levels in one or more of the memory locations will exceed the level at the output of the wipe lever means, and the waveform generator will be actuated at the time that the levels of this or these memory locations are applied to the comparator. This time corresponds with a block on the picture screen so that each memory location is associated with a respective block on the picture screen.

When the output of a memory location actuates the waveform generator, the picture B will appear in the block associated with that memory location in a manner determined by the particular waveform generated by 17 as above discussed.

As the output of the wipe lever means falls lower and lower, more and more blocks of picture B appear on the screen. The outputs of the wipe lever means and the levels of the memory locations are so adjusted that, when the output of the wipe lever means is at its lowest level, it is smaller than the levels in all of the memory locations. Thus, when the lever is moved to its opposing position, the screen will be completely filled with picture B.

Although several embodiments have been above described, this was for the purpose of illustrating, but not limiting, the invention. Various modifications, which will come readily to the mind of one skilled in the art are within the scope of the invention as defined in the appended claims.

We claim:

1. A matrix wipe generator for controlling a matrix switching arrangement for television signals, said matrix switching arrangement including at least one switch with a control terminal, said wipe generator comprising:
   storage means having a plurality of accessible storage locations, each location having a signal stored thereat;
   means for accessing said storage locations one at a time whereby to provide, at an output terminal of said storage means, the signal stored at the accessed location;
   comparator means having two input terminals and one output terminal;
   wipe lever means having a movable lever and an output terminal, and being adapted to provide, at the output terminal thereof, a signal which varies, from a lowest level to a highest level, depending on the position of said movable lever;
   the output terminal of said storage means being connected to one input terminal of said comparator means;
   the output terminal of said wipe lever means being connected to the other input terminal of said comparator means;
   waveform generator means having an input terminal and an output terminal;
   said output terminal of said waveform generator being connected to said control terminal of said one switch whereby to control the operation of said matrix switching arrangement;
   the output terminal of said comparator being connected to the input terminal of said waveform generator means;
   the levels of said signals in said memory locations varying non-sequentially relative to the sequence of said memory locations, the levels of said signals in said memory locations being between the highest and lowest levels of said signals of said wipe lever means;
   wherein, when a predetermined relationship exists as between the signal level at the one input terminal of said comparator and the signal level at the other input terminal of said comparator, said comparator will provide a signal to actuate said waveform generator means.

2. A generator as defined in claim 1 wherein said predetermined relationship exists when the signal level at the one input terminal of said comparator is greater than the signal level at the other input terminal of said comparator.

3. A generator as defined in claim 1 wherein said storage means comprises a ROM.

4. A generator as defined in claim 3 wherein said comparator is an analog comparator, and further comprising a high speed digital to analog convertor between the output of said ROM and the one input terminal of said comparator.

5. A generator as defined in claim 3 wherein said comparator is a digital comparator, and further comprising an analog to digital convertor between the output terminal of said wipe lever means and the other input terminal of said comparator.

6. A generator as defined in claim 3 wherein said means for accessing comprises:
   an oscillator;
   a first counter, a second counter and a third counter, each of said counters having a clock terminal, a reset terminal, and output means;
   said oscillator being locked to a multiple of the line frequency of said television signals;
   line pulses of said television signals being fed to the reset terminal of said first counter and to the clock terminal of said second counter;
   the output terminal of said oscillator being fed to the clock terminal of said first counter;
   vertical pulses of said television signals being fed to the reset terminals of said second and third counters;
   the output means of second counter being connected to the clock terminal of said third counter;
   the output means of said first counter being connected to one addressing axis of said ROM;
   the output means of said third counter being connected to the other addressing axis of said ROM;
   whereby, when the count on either the first or third counter is changed, a different storage location of said ROM is accessed.

7. A generator as defined in any of claims 1, 3 or 6 wherein the waveform produced by said waveform generator is a rectangular wave with increasing amplitude.

8. A generator as defined in any of claims 1, 3 or 6 wherein the waveform produced by said waveform generator is a triangular wave with increasing amplitude.

9. A generator as defined in any of claims 1, 3 or 6 wherein the waveform produced by said waveform generator is a rectangular wave of increasing amplitude, an increasing ramp on the forward side of the rectangular wave, and a decreasing ramp on the aft side of the rectangular wave.

10. A generator as defined in any of claims 1, 3 or 6 and further comprising a mix/effects switch arrangement having a transition switch and a matte signal source switch, each of said switches having control terminals;
    the output terminal of said waveform generator being connected to said control terminals.

* * * * *